(12) United States Patent
Chang et al.

(10) Patent No.: US 11,693,146 B2
(45) Date of Patent: Jul. 4, 2023

(54) CALCULATION METHOD FOR A DUAL-ENERGY X-RAY IMAGING SYSTEM

(71) Applicant: Institute of Nuclear Energy Research, Atomic Energy Council, Executive Yuan, R.O.C, Taoyuan (TW)

(72) Inventors: Chia-Hao Chang, Taoyuan (TW); Yu-Ching Ni, Taoyuan (TW); Sheng-Pin Tseng, Taoyuan (TW)

(73) Assignee: INSTITUTE OF NUCLEAR ENERGY RESEARCH, ATOMIC ENERGY COUNCIL, EXECUTIVE YUAN, R.O.C, Taoyuan (TW)

( * ) Notice: Subject to any disclaimer, the term of this patent is extended or adjusted under 35 U.S.C. 154(b) by 31 days.

(21) Appl. No.: 17/573,756

(22) Filed: Jan. 12, 2022

(65) Prior Publication Data

US 2022/0308252 A1   Sep. 29, 2022

(30) Foreign Application Priority Data

Mar. 26, 2021 (TW) .................................. 110111112

(51) Int. Cl.
  *G01V 5/00* (2006.01)
  *G01N 23/046* (2018.01)
(52) U.S. Cl.
  CPC ......... *G01V 5/0041* (2013.01); *G01N 23/046* (2013.01); *G01V 5/005* (2013.01)
(58) Field of Classification Search
  CPC .... G01V 5/005; G01V 5/0041; G01V 5/0016; G01N 23/046; G01N 23/087;

(Continued)

(56) References Cited

U.S. PATENT DOCUMENTS 8,290,120 B2 * 10/2012 Bjorkholm ........... G01N 23/087
 378/53
2005/0259781 A1 * 11/2005 Ying .................... G01N 23/046
 378/5

(Continued)

OTHER PUBLICATIONS

Chang, Chia-Hao et al., Calculation of effective atomic numbers using a rational polynomial approximation method with a dual-energy X-ray imaging system, Journal of X-Ray Science and Technology, Mar. 11, 2021, vol. 29, No. 2, pp. 317-330.

*Primary Examiner* — Irakli Kiknadze
(74) *Attorney, Agent, or Firm* — Locke Lord LLP; Tim Tingkang Xia, Esq.

(57) ABSTRACT

A calculation method for a dual-energy X-ray imaging system is provided. The calculation method for the dual-energy X-ray imaging system includes the following steps. A plurality of material attenuation coefficient ratio of the dual-energy projection image are established according to the reference materials with known material characteristics. The effective atomic number of each reference material and the material attenuation coefficient ratio are used to establish a calibration data set. A rational polynomial approximation method is adopted to obtain the characteristic model related to the material attenuation coefficient ratio of the reference material and the effective atomic number of the reference material. The material attenuation coefficient ratio of the dual-energy projection image of unknown material is established. The material attenuation coefficient ratio of the unknown material is substitute into the characteristic model to obtain the effective atomic number corresponding to the unknown material.

9 Claims, 3 Drawing Sheets

(58) Field of Classification Search
CPC .......... G01N 23/10; G01N 2223/1006; G01N 2223/423; G01N 2223/50; G01N 2223/639; G01N 2223/04; G01N 2223/303; G01N 23/083; G01N 23/04; G01N 2223/1016; G01N 2223/633; G01N 2223/501; G01N 2223/60; G01N 2223/5055; G01N 23/043; G01B 15/02; G01B 15/025; G01T 1/2018; G01T 1/22; G01T 1/248; G01T 1/36; G06T 11/003; G06T 11/008; G06T 7/0002
USPC .............................................. 378/50, 51, 62
See application file for complete search history.

(56) References Cited

U.S. PATENT DOCUMENTS

| | | | | |
|---|---|---|---|---|
| 2008/0273666 | A1* | 11/2008 | Walter | A61B 6/505 |
| | | | | 378/185 |
| 2010/0040192 | A1* | 2/2010 | Zhang | G01V 5/005 |
| | | | | 378/8 |
| 2017/0309043 | A1* | 10/2017 | Li | G06T 11/003 |
| 2020/0138398 | A1* | 5/2020 | Yamakawa | G01N 23/083 |

* cited by examiner

CALCULATION METHOD FOR A DUAL-ENERGY X-RAY IMAGING SYSTEM

CROSS REFERENCE TO RELATED APPLICATION

All related applications are incorporated by reference. The present application is based on, and claims priority from, Taiwan Application Serial Number 110111112 filed on Mar. 26, 2021, the disclosure of which is hereby incorporated by reference herein in its entirety.

FIELD OF THE INVENTION

The disclosure relates to an effective atomic number calculation method for dual-energy X-ray imaging systems.

BACKGROUND OF THE INVENTION

In recent years, with the rapid increase in terrorist incidents, the international demand for explosive detection systems (EDS) has gradually increased. Especially in flight, a small amount of explosives may cause a large number of casualties. Therefore, some advanced countries have been striving to develop new inspection methods in various research fields.

X-ray security inspection machine is one of the major ways for detecting explosives. X-ray security inspection machine, such as X-ray baggage scanner, can transport suitcases (backpacks, handbags, etc.) into the X-ray inspection channel via a conveyor belt. Then, the images of the objects in the suitcases can be displayed after the X-rays, radiated by the machine, pass through the suitcases. Finally, dangerous objects can be found out according to color difference. X-ray security inspection machine can be used to detect explosives or even detect smuggled goods or contraband goods. It is commonly used in various important facilities and gathering places, such as airports, seaports, courts, prisons, nuclear power plants, embassies, etc. so as to preserve national interests and public safety.

Traditional X-ray imaging technology (adopting a single X-ray source) can only detect the shape of an object and the attenuation intensity thereof. Besides, it is difficult to obtain the accurate attenuation coefficients of objects made of some specific materials due to the characteristics of X-ray. Traditional X-ray imaging technology can only obtain the signals from an object after the object is penetrated by X-ray, but cannot obtain the composition of the material inside the object; therefore, the effective atomic number of the above material cannot be obtained by using traditional X-ray imaging technology. In addition, the attenuation degree of the material is related to the characteristics of the material. Therefore, if a material is thin and of high density and another material is thick and of low density, the images, projected by traditional X-ray imaging technology, of the two materials are similar and cannot be distinguished from each other. In contrast, dual-energy X-ray imaging technology is able to measure the attenuation coefficients of X-rays in different energy bands. The effective atomic number of a material can be obtained according to the attenuation coefficient ratio calculated by the two attenuation coefficients of the material of two different energy bands. Hence, the security inspection machine with dual-energy X-ray imaging function can improve the detection ability for contraband (such as plastic explosives), so dual-energy X-ray security inspection technology gradually replaces traditional X-ray imaging technology and becomes the tendency of security inspection field.

The calculation accuracy of the effective atomic number depends on the calibration model integrated with the approximation method. In general, currently available two-dimensional X-ray and three-dimensional computed tomography (CT) security inspection systems usually adopt a second-order polynomial approximation method to implement the fitting of the calibration data set in order to achieve high computational performance (such as computing time) and high accuracy, as shown in Equation (1) given below:

$$R = c_1 Z_{eff}^2 + c_2 Z_{eff} + c_3 \tag{1}$$

As shown in Equation (1), assuming that the effective atomic number $Z_{eff}$ and the attenuation coefficient R are known parameters, the coefficients c1, c2, and c3 can be calculated according to these parameters. However, this currently available method has a limitation because the fitting effect of the method is not good enough for materials having low effective atomic number (i.e. $Z_{eff}$ is less than 7), which will cause the effective atomic number of the test sample to be underestimated. Moreover, the currently available method does not have an explanation for the calculation accuracy of inorganic materials, and the scope of application is limited. It has become an important issue to solve the above problems of the currently available methods.

SUMMARY OF THE INVENTION

An effective atomic number calculation method for dual-energy X-ray imaging systems is provided, which can improve the accuracy and application scope of effective atomic number calculation with a view to enhance the performance of the X-ray baggage scanners in detecting contraband.

An embodiment of the disclosure provides an effective atomic number calculation method for a dual-energy X-ray imaging system, which includes the following steps: establishing an attenuation coefficient ratio of a dual-energy projection image of each of a plurality of reference materials according to known material characteristics of the reference materials respectively; establishing a calibration data set according to an effective atomic number of each of the reference materials and the attenuation coefficient ratio corresponding thereto; obtaining a characteristic model of a correlation between the material attenuation coefficient ratios and the effective atomic numbers of the reference materials by a rational polynomial approximation method; establishing a material attenuation coefficient ratio of a dual-energy projection image of an unknown material; and substituting the material attenuation coefficient ratio of the unknown material into the characteristic model to obtain the effective atomic number corresponding to the unknown material.

In one embodiment, the step of obtaining the characteristic model of the correlation between the material attenuation coefficient ratios and the effective atomic numbers of the reference materials by the rational polynomial approximation method further includes the following step: performing an iterative method to execute an iterative optimization according to a measured value of the effective atomic number of the reference material corresponding thereto.

In one embodiment, the iterative method is a nonlinear least-squares method.

In one embodiment, the step of establishing the attenuation coefficient ratio of the dual-energy projection image of each of the reference materials according to the known material characteristics of the reference materials respectively includes the following steps: providing a material with known material characteristic as one of the reference materials, wherein the effective atomic number of the reference material is known; obtaining a high-energy projection image and a low-energy projection image of the reference material with known material characteristic; and calculating the material attenuation coefficient ratio of the reference material based on the high-energy projection image and the low-energy projection image.

In one embodiment, the step of obtaining the characteristic model of the correlation between the material attenuation coefficient ratios and the effective atomic numbers of the reference materials by the rational polynomial approximation method includes the following step: fitting a relation between the effective atomic numbers and the material attenuation coefficient ratios of the reference materials via a polynomial regression model.

In one embodiment, the step of obtaining the characteristic model of the correlation between the material attenuation coefficient ratios and the effective atomic numbers of the reference materials by the rational polynomial approximation method includes the following step: performing curve fitting for the calibration data set to obtain polynomial fitting coefficients of the polynomial regression model.

In one embodiment, the step of establishing a material attenuation coefficient ratio of the dual-energy projection image of the unknown material includes the following steps: providing the unknown material; obtaining a high-energy projection and a low-energy projection image of the unknown material via the dual-energy X-ray imaging system; and calculating the material attenuation coefficient ratio of the unknown material based on the high energy projection image and the low energy projection image of the unknown material.

In one embodiment, the step of substituting the material attenuation coefficient ratio of the unknown material into the characteristic model to obtain the effective atomic number corresponding to the unknown material includes the following step: converting the effective atomic number of the unknown material into a two-dimensional map.

In one embodiment, the step of converting the effective atomic number of the unknown material into the two-dimensional map includes the following step: coding the two-dimensional map of the effective atomic number by a pseudo-color encoding and superimposing the two-dimensional map on an X-ray image.

Based on the above, the effective atomic number calculation method for dual-energy X-ray imaging systems according to the embodiments of the disclosure can effectively calculate the effective atomic number of an unknown material (i.e. a material whose effective atomic number is unknown) based on the rational polynomial approximation method. That is, the calculating method according to the embodiments of the disclosure can improve the calculation accuracy of effective atomic numbers without increasing the calculation time but maintaining the same calculation performance. Accordingly, the method can help the security personnel to more efficiently find out contraband so as to enhance border, homeland and flight security.

In addition, the method according to the embodiments of the disclosure can be applied to not only 2D X-ray and 3D computer tomography security inspection systems (such as carry-on luggage and check-in luggage, container inspection, etc.), but also can be applied to other industrial non-destructive testing (NDT) fields, such as valuable metal recovery business and ore screening applications.

In addition, the method according to the embodiments of the disclosure also further improves the calculation accuracy of non-organic materials (effective atomic number range: $Z_{\text{eff}}$ is greater than 10, but less than 20), thereby enhancing the scope of application of the method.

For easier to understand the disclosure, the following exemplary embodiments with the accompanying drawings to describe in detail as follows.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DESCRIPTION OF THE EXEMPLARY EMBODIMENTS

Figure 1:
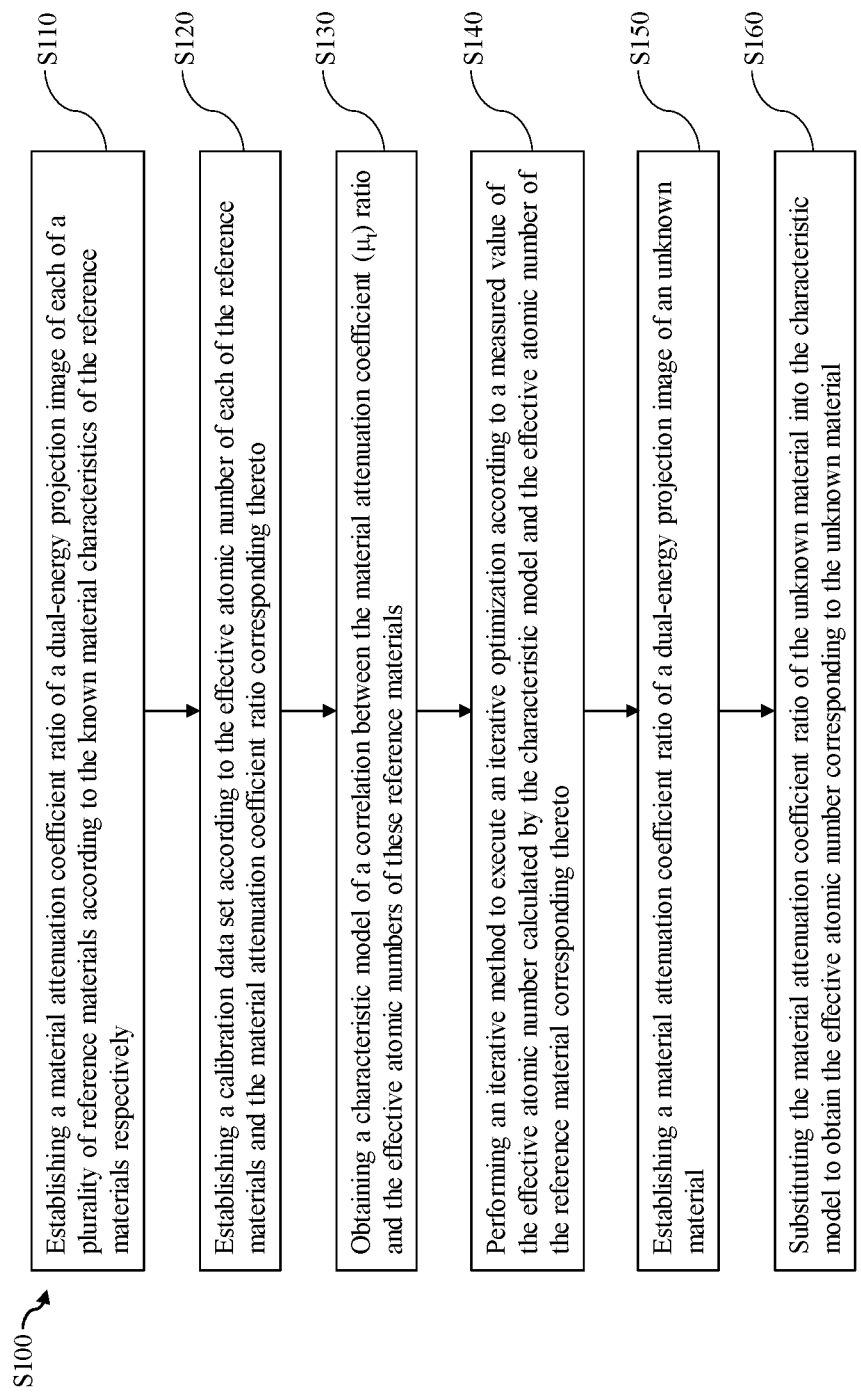
FIG. 1 is a flow chart of an effective atomic number calculation method for a dual-energy X-ray imaging system in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a flow chart of an effective atomic number calculation method for a dual-energy X-ray imaging system in accordance with one embodiment of the disclosure. In this embodiment, the dual-energy X-ray imaging system utilizes a dual-energy X-ray detector to image an object via a small amount of radiation of two different radiation levels so as to obtain 2 sets of X-ray projection images with different energies, such as high-energy ($E_H$) projection image ($P_H(r)$) and low-energy ($E_L$) projection image ($P_L(r)$). The high-energy and low-energy thresholds can be defined based on actual conditions.

In general, the main components of a dual-energy X-ray imaging system may include an X-ray source, an image receptor, an imaging mechanism, a control computer, etc. However, the detailed structure and components of the dual-energy X-ray imaging system described therein are just for illustration instead of limiting the scope of the disclosure. In addition, the dual-energy X-ray imaging system can generate a dual-energy X-ray via various technologies, such as dual-source, rapid kV switching, or dual-layer scintillation crystal. Taking dual-source as an example, two sets of X-ray tubes can obtain low-energy and high-energy X-ray imaging data via different tube voltage settings. Compared with traditional single-source X-ray imaging technology, dual-energy X-ray technology can provide more material characteristics information (such as attenuation coefficient, effective atomic number, etc.). The dual-energy X-ray imaging system described in the disclosure can be regarded as any of the above-mentioned dual-energy X-ray technologies. The effective atomic number calculation method S100 for the dual-energy X-ray imaging system of this embodiment includes the following steps S110~S160.

The first step is Step S110: establishing a material attenuation coefficient ($\mu_k$) ratio R ($E_L$, $E_H$, $Z_{eff}$) of a dual-energy projection image of each of a plurality of reference materials according to the known material characteristics of the reference materials respectively.

It should be noted that Step S110 may need several reference materials and include the following steps: providing a material with known material characteristic as a reference material. Here, the material with known physical characteristics, chemical characteristics or material characteristics is used as the reference material for subsequent calibration. In this embodiment, the effective atomic number of the material is already known, so the material is suitable to serve as a reference material, wherein the effective atomic number is supposed to be equal to the actual atomic number. However, it is difficult to obtain the actual atomic number of a mixture or compound. Therefore, the effective atomic number described therein means the average atomic number calculated according to the composition of the material. The effective atomic number is an estimate of a hypothetical single element. The density of the element is equal to that of the substance to be evaluated and the X-ray attenuation generated by the element is also the same with that of the substance to be evaluated. In one embodiment, if the composition of the material is known, the effective atomic number thereof can be expressed by Equation (2) given below:

$$Z_{eff} = \left( \sum_i \frac{z_i/A_i}{\sum_j z_j/A_j} z_i^n \right)^{1/n} \quad (2)$$

In Equation (2), i or j stands for the index of each element in the composition of the material; $z_i$ or $z_j$ stands for the atomic number of each element in the composition of the material; $A_i$ or $A_j$ stands for the atomic weight of each element in the composition of the material; n is a constant.

After the materials with known material characteristics are provided to serve as the reference materials, a dual-energy X-ray imaging system is used to obtain 2 sets of X-ray projection images, with two different energies, of each of the reference materials with known material characteristics. In this embodiment, the reference material with known material characteristics is placed in the dual-energy X-ray imaging system so as to obtain the X-ray projection images with different energies via appropriate imaging parameters. The X-ray projection images with different energies are high energy ($E_H$) projection images ($P_H(r)$) and low energy ($E_L$) projection images ($P_L(r)$). It should be noted that the high-energy ($E_H$) projection images and the low-energy ($E_L$) projection images may be two-dimensional images.

After the X-ray projection images with different energies are obtained, the material attenuation coefficient ($\mu_t$) ratio R ($E_L$, $E_H$, $Z_{eff}$) of the reference material can be calculated according to high energy ($E_H$) projection images ($P_H(r)$) and low energy ($E_L$) projection images ($P_L(r)$). In this embodiment, the material attenuation coefficient ratio can be calculated by Equation (3) given below:

$$R(E_L, E_H, Z_{eff}) = \frac{P_L(r)}{P_H(r)} = \frac{\mu_t(E_L, Z_{eff})}{\mu_t(E_H, Z_{eff})} \quad (3)$$

Hence, dual-energy X-ray imaging technology can measure the attenuation coefficient of X-rays of different energy bands and the effective atomic number $Z_{eff}$ of a material can be obtained according to the material attenuation coefficient ratio of the images with two different energies (such as the high-energy ($E_H$) projection image and the low-energy ($E_L$) projection image of this embodiment). The above $E_L$ and $E_H$ respectively stand for the low-energy projection image and the high-energy projection image in the dual-energy X-ray imaging system. Besides, $\mu_t$ ($E_L$, $Z_{eff}$) and $\mu_t$ ($E_H$, $Z_{eff}$) stand for the total attenuation coefficient of low-energy and the total attenuation coefficient of high-energy respectively. All of these parameters are related to energy and material.

Figure 2:
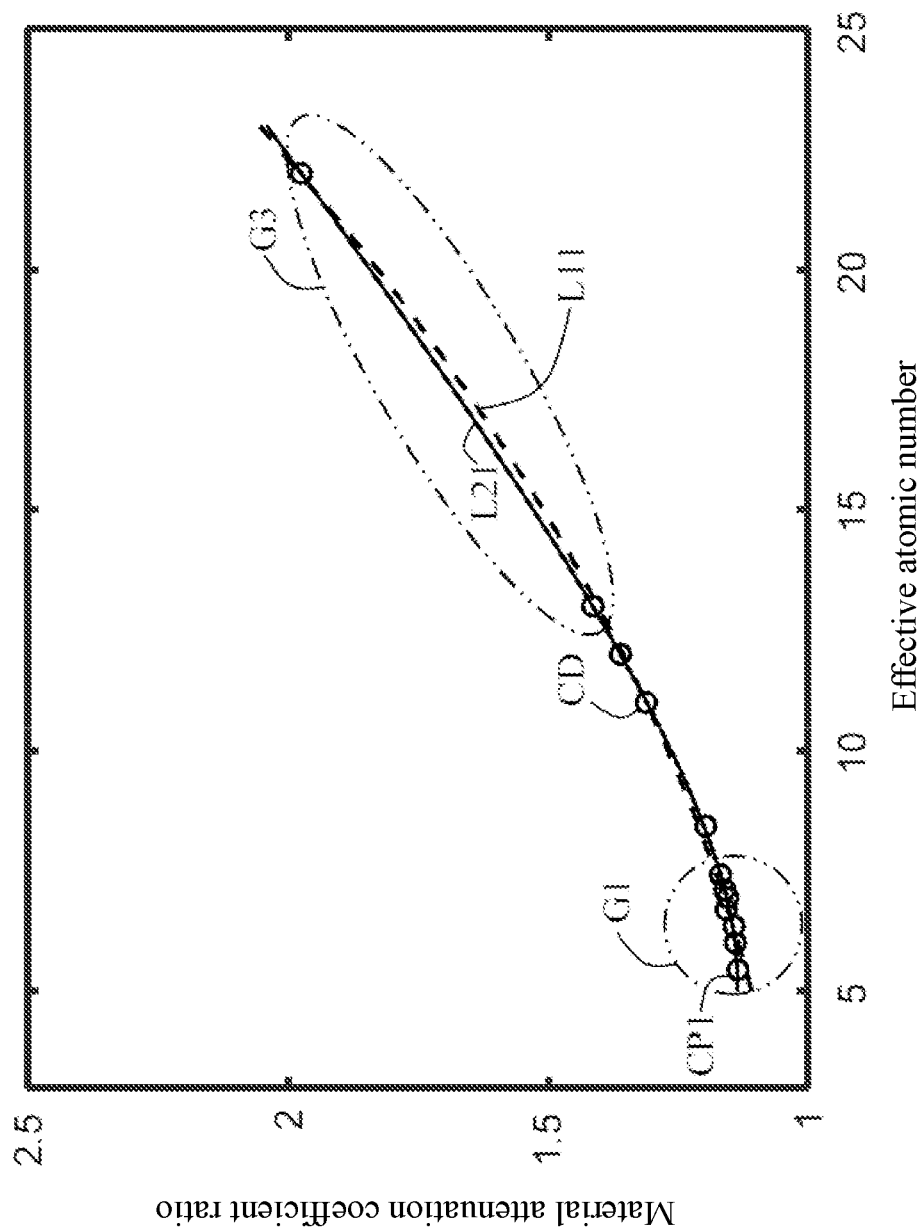
FIG. 2 is a schematic diagram of a simulation test result of a characteristic model of effective atomic numbers and material attenuation coefficient ratios in accordance with one embodiment of the disclosure.
Figure 3:
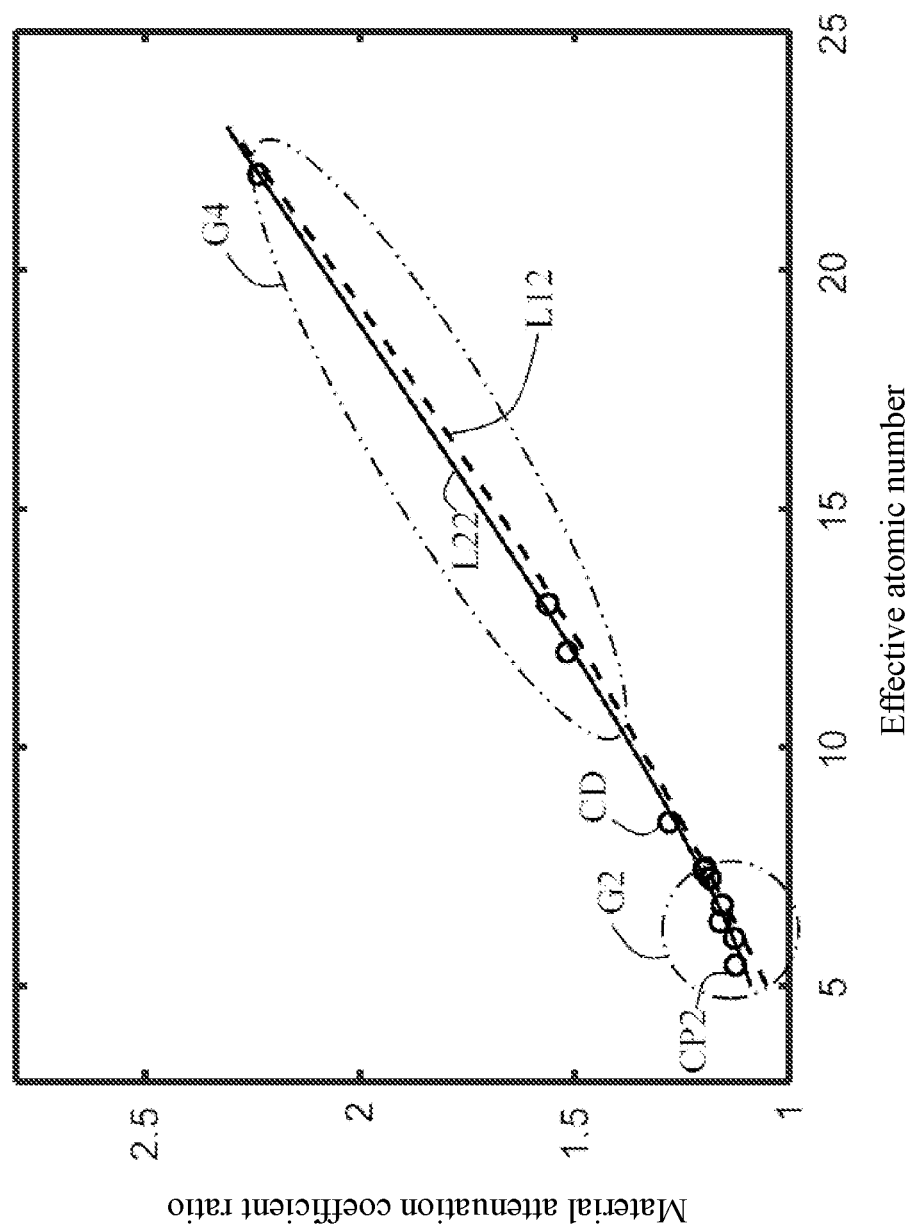
FIG. 3 is a schematic diagram of an experimental test result of the characteristic model of effective atomic numbers and material attenuation coefficient ratios in accordance with one embodiment of the disclosure.

Next, the method proceeds to Step S120: establishing a calibration data set according to the effective atomic number $Z_{eff}$ of each of the reference materials and the material attenuation coefficient ($\mu_t$) ratio R ($E_L$, $E_H$, $Z_{eff}$), obtained by Equation (3), corresponding thereto. It should be noted that the calibration data set may include several pieces of information, such as the effective atomic number $Z_{eff}$ and the material attenuation coefficient ($\mu_t$) ratio R ($E_L$, $E_H$, $Z_{eff}$). Alternatively, the calibration data set may also be a mathematical model (such as a polynomial) which includes the aforementioned information. That is, the calibration data set can be regarded as several pieces of information or a mathematical model. In addition, Step S120 further includes the following step: calculating the material attenuation coefficient ($\mu_t$) ratio R ($E_L$, $E_H$, $Z_{eff}$) of the reference material with known material characteristics. Since the effective atomic number of the reference material is known, the calibration data set for the effective atomic numbers $Z_{eff}$ and the material attenuation coefficient ($\mu_t$) ratios R ($E_L$, $E_H$, $Z_{eff}$) of these reference materials can be established according to Equation (3) for reference. Thus, the calibration data set can be established based on the effective atomic numbers and the material attenuation coefficient ratios of the reference materials. Please refer to FIG. 2 and FIG. 3. FIG. 2 is a schematic diagram of a simulation test result of a characteristic model of effective atomic numbers $Z_{eff}$ and material attenuation coefficient ratios R in accordance with one embodiment of the disclosure. FIG. 3 is a schematic diagram of an experimental test result of the characteristic model of effective atomic numbers $Z_{eff}$ and material attenuation coefficient ratios R in accordance with one embodiment of the disclosure. In FIG. 2 and FIG. 3, the horizontal axis is the effective atomic number $Z_{eff}$, and the vertical axis is the attenuation coefficient ratio R. The circles in FIG. 2 and FIG. 3 stand for the calibration data set CD, which is obtained according to the reference materials with known effective atomic numbers and the material attenuation coefficient ($\mu_k$) ratios R ($E_L$, $E_H$, $Z_{eff}$) obtained via the dual-energy images thereof. The short dash line stands for the curves L11 and L12 obtained via the currently available second-order polynomial approximation method. The continuous line stands for the curves L21 and L22 obtained via the rational polynomial approximation method according to the embodiment of the disclosure. In FIG. 2, the curve L11 of the second-order polynomial approximation method and the curve L21 of the rational polynomial approximation method are obtained by a simulation test. In the FIG. 3, the curve L12 of the second-order polynomial approximation method and the curve L22 of the rational polynomial approximation method are obtained by an experimental test. In FIG. 2 and FIG. 3, the regions marked by chain lines stand for low atomic number regions G1, G2 or high atomic number regions G3, G4 respectively. Since the effective atomic numbers $Z_{eff}$ of the reference materials and the corresponding material attenuation coefficient ratios R are known, these data can serve as the comparison data of an approximate method when serving as the calibration data set CD.

After Step S120, the method proceeds to Step S130: obtaining a characteristic model (R-$Z_{eff}$) of a correlation between the material attenuation coefficient ($\mu_r$) ratio R ($E_L$, $E_H$, $Z_{eff}$) and the effective atomic numbers $Z_{eff}$ of these reference materials. Step S130 includes the following steps: according to Equation (3), a polynomial regression model can be used to fit the relation between the effective atomic numbers $Z_{eff}$ and the material attenuation coefficient ($\mu_r$) ratios $R_{ref}$($E_L$, $E_H$, $Z_{eff}$) of these reference materials. The polynomial regression model can be expressed by Equation (4) given below:

$$R_{ref}(E_L, E_H, Z_{eff}) = \Sigma_{m=0}^{k} a_n (Z_{eff})^m \qquad (4)$$

In Equation (4), $a_n$ stands for the k-th coefficient of the polynomial model of Equation (4); m stands for the order. As shown in FIG. 2 and FIG. 3, in addition to the calibration data set CD, Step S130 further includes the following steps: performing curve fitting for the calibration data set to obtain polynomial fitting coefficients $a_n$ of the polynomial regression model. In other words, the object of the step is to find a relational function between the effective atomic numbers $Z_{eff}$ and the material attenuation coefficient ($\mu_r$) ratios $R_{ref}$ ($E_L$, $E_H$, $Z_{eff}$) in Equation (4) so as to get close to the calibration data set. Therefore, the embodiment of the disclosure provides several reference materials with known material characteristics and then obtains the material attenuation coefficient ratios of these reference materials through the dual-energy X-ray imaging system so as to obtain the calibration data set. The effective atomic numbers of these reference materials are known, so can be used to calibration the polynomial regression model so as to establish and obtain the characteristic model (R-$Z_{eff}$ model) of the correlation of the material attenuation coefficient ($\mu_k$) ratios R ($E_L$, $E_H$, $Z_{eff}$) and the effective atomic numbers $Z_{eff}$ of the reference materials.

According to Equation (4), the currently available technology can express the relation between the effective atomic number $Z_{eff}$ and the ratio of dual-energy logarithmic projections by Equation (5) given below:

$$R_{old} = c_1 Z_{eff}^2 + c_2 Z_{eff} + c_3 \qquad (5)$$

In Equation (5), $c_1$, $c_2$, and $c_3$ are coefficients. In other words, after the material attenuation coefficient ($\mu_k$) ratio $R_{old}$ ($E_L$, $E_H$, $Z_{eff}$) is calculated according to the currently available technology, the relation between the effective atomic number $Z_{eff}$ and the material attenuation coefficient ($\mu_k$) ratio $R_{old}$ ($E_L$, $E_H$, $Z_{eff}$) can be expressed by the function of the second-order polynomial approximation method. Then, the above coefficients $c_1$, $c_2$, and $c_3$ can be calculated via a simultaneous equation according to the known effective atomic numbers $Z_{eff}$ of different reference materials. Afterward the curves L11, L12 of the second-order polynomial approximation method shown in FIG. 2 and FIG. 3 can be drawn. The curve L11 shown in FIG. 2 is calculated via a numerical simulation and the curve L12 shown in FIG. 3 is the inference result obtained via an experimental test. However, the limitation of the currently available method is that the fitting effect thereof is not good enough for materials with low atomic numbers ($Z_{eff}$ is less than 7). The low atomic number regions G1 and G2 in FIG. 2 and FIG. 3 clearly show the curves L11 and L12 of the second-order polynomial approximation method already deviate from the calibration points CP1 and CP2 in the calibration data set CD of the low atomic number regions G1 and G2 when the effective atomic numbers $Z_{eff}$ of the materials are 5. The calibration point CP1 means that the effective atomic number $Z_{eff}$ of the material in the point among the calibration data set CD of FIG. 2 is close to 5. Similarly, the calibration point CP2 means that the effective atomic number $Z_{eff}$ of the material in the point among the calibration data set CD of FIG. 3 is close to 5. As shown in FIGS. 2 and 3, the material attenuation coefficient ($\mu_r$) ratios $R_{old}$ ($E_L$, $E_H$, $Z_{eff}$) corresponding to the effective atomic numbers $Z_{eff}$ of the curves L11, L12 of the second-order polynomial approximation method are lower than the material attenuation coefficient ($\mu^r$) ratio $R_{ref}$ ($E_L$, $E_H$, $Z_{eff}$) of the calibration data set CD of the reference materials. This situation may cause the effective atomic number $Z_{eff}$ of the test sample to be underestimated. In addition, the effective atomic number $Z_{eff}$ can be obtained by Equation (5), which can be expressed by Equation (6) given below:

$$Z_{eff} = \text{real}\left[\frac{-c_2 - \sqrt{c_2^2 - 4c_1(c_3 - R_{old})}}{2c_1}\right] \qquad (6)$$

In Equation (6), "real" stands for the real number of $$\left[\frac{-c_2 - \sqrt{c_2^2 - 4c_1(c_3 - R_{old})}}{2c_1}\right].$$

That is to say, the low-energy projection image and high-energy projection image of the unknown material can be obtained via the dual-energy X-ray imaging system so as to further obtain the material attenuation coefficient ($\mu_r$) ratio R ($E_L$, $E_H$, $Z_{eff}$) and the effective atomic number $Z_{eff}$ of the unknown material.

In contrast, according to Equation (4), the embodiment can express the effective atomic number $Z_{eff}$ and the ratio of dual-energy logarithmic projection by Equation (7) based on the rational polynomial approximation method:

$$R_{new} = \frac{c_1 Z_{eff}^2 + c_2 Z_{eff}^2 + c_3}{1 + c_4 Z_{eff}} \qquad (7)$$

Comparing Equation (7) with Equation (5) used by the currently available technology, the rational polynomial approximation method adopted by this embodiment adds the function, (1+$c_4 Z_{eff}$), to the denominator, which can prevent from the underestimation of the materials with low effective atomic number $Z_{eff}$. Besides, the $c_1$, $c_2$, $c_3$, and $c_4$ in Equation (7) are coefficients, which can be obtained according to the known effective atomic numbers $Z_{eff}$ of different reference materials through a simultaneous equation. Then, the curves L21 and L22 of the rational polynomial approximation method shown in FIG. 2 and FIG. 3 can be drawn accordingly. The curves L21, of the rational polynomial approximation method, shown in FIG. 2 is calculated via a numerical simulation. The curve L22, of the rational polynomial approximation method, shown in FIG. 3 is the inference result obtained via an experimental test. The low atomic number regions G1 and G2 in FIG. 2 and FIG. 3 clearly show when the effective atomic numbers $Z_{eff}$ of the materials are close to 5, the curves L21 and L22 of the rational polynomial approximation method are close to and fitted to the calibration points CP1 and CP2 in the calibration data set CD in the low atomic number regions G1 and G2. In addition, the curves L21 and L22 of the rational polynomial approximation method in the low atomic number regions G1 and G2 shown in the entire FIG. 2 and FIG. 3 are quite fitted to the calibration data set CD. In other words, the material attenuation coefficient ($\mu^r$) ratios $R_{new}$ ($E_L$, $E_H$, $Z_{eff}$) corresponding to the effective atomic numbers $Z_{eff}$ of the curves L21, L22 of the rational polynomial approximation method are closer to the material attenuation coefficient ($\mu_r$) ratios $R_{ref}$ ($E_L$, $E_H$, $Z_{eff}$) corresponding to the calibration data set CD of the reference materials. Accordingly, the embodiment can solve the problem that the fitting effect of the currently available technology is not good enough for materials with low effective atomic numbers ($Z_{eff}$ is lower than 7). Therefore, the method according to the embodiment of the disclosure can indeed improve the shortcoming, of the currently available technology, that the effective atomic numbers $Z_{eff}$ of some materials tend to be underestimated when the effective atomic numbers of these materials are low. Further, compared with Equation (5), Equation (7) does not increase the order thereof (the equation is also a second-order polynomial), which can improve the calculation accuracy of the effective atomic numbers $Z_{eff}$, but the calculation performance thereof remains unchanged.

Moreover, as shown in FIG. 2 and FIG. 3, the curves L21 and L22 of the rational polynomial approximation method in the low atomic number regions G1 and G2 shown are quite fitted to the calibration data set CD. Besides, the material attenuation coefficient ($\mu_r$) ratios $R_{new}$ ($E_L$, $E_H$, $Z_{eff}$) corresponding to the effective atomic numbers in the curves L21 and L22 of the rational polynomial approximation method according to the embodiment of the disclosure are also quite close to the material attenuation coefficient ($\mu_r$) ratio $R_{ref}$ ($E_L$, $E_H$, $Z_{eff}$) of the calibration data set CD. Therefore, for inorganic (Non-organic) materials (the effective atomic number $Z_{eff}$ range: $Z_{eff}$ is greater than 10, but less than 20), the high atomic number regions G3 and G4 shown in FIGS. 2 and 3 show that the curves L21, L22 of the rational polynomial approximation method adopted by the embodiment of the disclosure are closer to the calibration data set CD when compared with the curves L11, L12 of the second-order polynomial approximation method adopted by the currently available technology. Thus, the method according to the embodiment of the disclosure can further improve the calculation accuracy of the inorganic materials.

In addition, in this embodiment, after the material attenuation coefficient ($\mu_r$) ratios R ($E_L$, $E_H$, $Z_{eff}$) are calculated according to Equation (3), the relation between the effective atomic numbers $Z_{eff}$ and the material attenuation coefficient ($\mu_r$) ratio $R_{new}$ ($E_L$, $E_H$, $Z_{eff}$) is expressed by the function of the rational polynomial approximation method shown in Equation (7). The effective atomic number $Z_{eff}$ can be obtained by Equation (7), which can be further expressed by Equation (8) given below:

$$Z_{eff} = \text{real}\left[\frac{-c_2/R_{new} + c_4 - \sqrt{(c_2/R_{new} - c_4)^2 - 4(c_1/R_{new})(c_3/R_{new} - 1)}}{2c_1/R_{new}}\right] \quad (8)$$

In Equation (8), "real" stands for the real number of $$\left[\frac{-c_2/R_{new} + c_4 - \sqrt{(c_2/R_{new} - c_4)^2 - 4(c_1/R_{new})(c_3/R_{new} - 1)}}{2c_1/R_{new}}\right].$$

Then, the characteristic model (R-$Z_{eff}$ model) of the correlation between the material attenuation coefficient ($\mu_r$) ratios $R_{new}$ ($E_L$, $E_H$, $Z_{eff}$) and the effective atomic numbers $Z_{eff}$ of the reference materials can be established. In other words, the low-energy projection image and high-energy projection image of an unknown material can be obtained by the dual-energy X-ray imaging system so as to further obtain the material attenuation coefficient ($\mu_r$) ratio $R_{new}$ ($E_L$, $E_H$, $Z_{eff}$) thereof. Afterward, the effective atomic number $Z_{eff}$ of the unknown material can be obtained.

The above steps S110~S130 are the material characteristic calibration phase, the main purpose thereof is to establish the characteristic model (R-$Z_{eff}$ model) of the correlation between the material attenuation coefficient ($\mu_r$) ratios $R_{new}$ ($E_L$, $E_H$, $Z_{eff}$) and the effective atomic numbers $Z_{eff}$. In one embodiment, in order to reduce the errors between the measured values ($Z_{eff}$ ($c_1$, $c_2$, $c_3$, $c_4$)), calculated by the above-mentioned material characteristic calibration phase, of the effective atomic numbers $Z_{eff}$ and the theoretical values of the effective atomic numbers $Z_{eff}$, the reference materials with known material characteristics, as described in Step S110, are used as the theoretical values (or reference values) of the effective atomic numbers $Z_{eff}$. After Step S130, the material characteristic calibration phase further includes the following Step S140: performing an iterative method to execute an iterative optimization according to a measured value $Z_{eff}$ ($c_1$, $c_2$, $c_3$, $c_4$) of the effective atomic number $Z_{eff}$ calculated by the characteristic model and the effective atomic number $Z_{eff}$ of the reference material corresponding thereto, as shown in Equation (9) given below:

$$E = \Sigma_{q=1}^{r}[Z_{eff,q} - Z_{eff,q}(c_1,c_2,c_3,c_4)]^2 \quad (9)$$

In Equation (9), "E" stands for the square error value; "q" stands for the numbers of the reference materials for calibration; "r" stands for the quantity of reference materials. That is, the square error value E means the square error value between the effective atomic numbers $Z_{eff}$ of the reference materials with known material characteristics and the measured values $Z_{eff}$ (c1, c2, c3, c4) of the effective atomic numbers calculated by the characteristic model (R-$Z_{eff}$ model).

In Step S140, in this embodiment, the iterative method is a nonlinear least-squares method, thereby reducing the errors between the theoretical value of effective atomic numbers ($Z_{eff}$) and the measured values of effective atomic numbers ($Z_{eff}$(c1, c2, c3, c4)) derived from the aforementioned material characteristic calibration phase. In this way, the calculation accuracy of the coefficients of the rational polynomial approximation method according to the embodiment of the disclosure can be effectively improved. Of course, the iteration method is not limited to the above-mentioned nonlinear least-squares method. In other embodiments, Newton's method, conjugate iteration method, variable scale iteration method, slope projection method, etc., may also be used.

After steps S110~S140 (the above-mentioned material characteristic calibration phase) are performed, the method proceeds to Step S150: establishing a material attenuation coefficient ($\mu_r$) ratio $R_{un}$ ($E_L$, $E_H$, $Z_{eff}$) of a dual-energy projection image of an unknown material. This step 150 includes the following steps: providing an unknown material, which is a material to be tested and the effective atomic number thereof is unknown. Then, the unknown material is processed by the dual-energy X-ray imaging system in order to obtain 2 sets of X-ray projection images, of the unknown material, with different energies. In this embodiment, the unknown material with unknown characteristics is placed in the dual-energy X-ray imaging system. Then, 2 sets of X-ray projection images, of a reference material, can be obtained according to the same imaging parameters via the aforementioned Step S110, wherein these X-ray projection images of the reference material are high energy ($E_H$) projection images (high-energy image, $P_H(r)$) and low-energy ($E_L$) projection images (low energy image, $P_L(r)$). After the X-ray projection images with different energies are obtained, the material attenuation coefficient ($\mu_4$) ratio R ($E_L$, $E_H$, $Z_{eff}$) of the unknown material can be calculated according to the high-energy ($E_H$) projection image ($P_H(r)$) and the low-energy ($E_L$) projection image ($P_L(r)$). That is, the material attenuation coefficient ($\mu_k$) ratio $R_{un}$ ($E_L$, $E_H$, $Z_{eff}$) can be calculated according to Equation (3). More specifically, the material attenuation coefficient ($\mu_k$) ratio $R_{un}$ ($E_L$, $E_H$, $Z_{eff}$) can be obtained according to each of the pixels of each high-energy ($E_H$) projection image and the pixel, at the corresponding position, of the corresponding low-energy ($E_L$) projection image.

Next, the method proceeds to Step S160: substituting the material attenuation coefficient ($\mu_r$) ratio $R_{un}$ ($E_L$, $E_H$, $Z_{eff}$) of the unknown material into the characteristic model (R-$Z_{eff}$ model) to obtain the effective atomic number $Z_{eff}$ corresponding to the unknown material. Specifically, Step S160 includes the following step: converting the effective atomic number of the unknown material into a two-dimensional map. The high-energy projection images and low-energy projection images are two-dimensional images. As described above, each of the pixels of each high-energy and low-energy projection image and the pixel, at the corresponding position, of the corresponding low-energy projection image have a material attenuation coefficient ($\mu_k$) ratio $R_{un}$ ($E_L$, $E_H$, $Z_{eff}$) respectively. Therefore, the material attenuation coefficient ($\mu_k$) ratio $R_{un}$ ($E_L$, $E_H$, $Z_{eff}$) corresponding to each pixel can be obtained through Step S160. Then, the material attenuation coefficient ($\mu_r$) ratio $R_{un}$ ($E_L$, $E_H$, $Z_{eff}$) corresponding to each pixel can be converted into the two-dimensional map of the effective atomic number of the unknown material.

In order to verify the method according to the embodiment of the disclosure, a dual-energy X-ray imaging simulation is performed and the result shows that the relative differences between all measured values ($Z_{eff}$ (c1, c2, c3, c4)) of the effective atomic numbers calculated by the method according to the embodiment of the disclosure and the corresponding reference values (i.e. the effective atomic numbers of the reference materials with known material characteristics) are less than 4.99%. That is, the relative difference of the rational polynomial approximation method according to the embodiment of the disclosure is at most 4.99%, whereas the currently available technology results in higher relative difference or even the relative difference thereof may be up to 11.00%. Therefore, the method according to the embodiment of the disclosure is more stable and more accurate. The details of the simulation result are shown in Table 1:

TABLE 1

| | | Effective atomic number | | | |
| | | Polynomial | | Rational polynomial | |
| Material | Reference value | Measured value | Relative difference | Measured value | Relative difference |
| --- | --- | --- | --- | --- | --- |
| Polyethylene | 5.444 | 6.04 | 11.00 | 5.32 | −2.24 |
| Ethanol | 6.35 | 6.31 | −0.61 | 6.23 | −1.83 |
| Urethane | 6.698 | 6.85 | 2.22 | 7.05 | 4.99 |
| Delrin | 6.95 | 6.75 | −2.86 | 6.92 | −0.37 |
| TNT | 7.26 | 6.93 | −2.48 | 7.15 | 0.62 |
| Water | 7.42 | 7.21 | −2.83 | 7.48 | 0.74 |
| Teflon | 8.43 | 8.13 | −3.61 | 8.42 | −0.23 |
| Magnesium | 12 | 12.22 | 1.83 | 12.08 | 0.67 |
| Aluminum | 13 | 13.66 | 5.08 | 13.39 | 3.00 |

In table 1, "Polynomial" stands for the polynomial approximation of currently available technology, and "Rational polynomial" stands for the rational polynomial approximation method according to the embodiment of the disclosure.

On the other hand, the dual-energy X-ray imaging experimental test result shows that the relative differences between all measured values of effective atomic numbers ($Z_{eff}$(c1, c2, c3, c4)) and the corresponding reference values (i.e. the effective atomic numbers $Z_{eff}$ of the reference materials with known material characteristics) calculated by the method according to the embodiment of the disclosure are less than 8.33%. Furthermore, the relative differences of the effective atomic numbers of most materials can be less than 5%, which is better than the currently available technology by 16.07%. The details of the experimental test result are shown in Table 2:

TABLE 2

| | | Effective atomic number | | | |
| | | Polynomial | | Rational polynomial | |
| Material | Reference value | Measured value | Relative difference | Measured value | Relative difference |
|---|---|---|---|---|---|
| Polyethylene | 5.444 | 6.31 | 16.07 | 5.89 | 8.33 |
| Carbon | 6 | 6.37 | 6.11 | 5.96 | −0.69 |
| Ethanol | 6.35 | 6.91 | 9.29 | 6.63 | 4.38 |
| Urethane | 6.698 | 6.85 | 2.32 | 6.53 | −2.49 |
| TNT | 7.26 | 7.35 | 1.25 | 7.07 | −2.55 |
| Water | 7.42 | 7.57 | 2.05 | 7.31 | −1.52 |
| C4 | 7.47 | 7.54 | 0.91 | 7.27 | −2.66 |
| Semtex-H | 7.48 | 7.57 | 1.23 | 7.31 | −2.31 |
| Teflon | 8.43 | 8.93 | 5.99 | 8.68 | 2.91 |
| Magnesium | 12 | 12.62 | 5.19 | 12.21 | 1.78 |
| Aluminum | 13 | 13.29 | 2.21 | 12.85 | −1.13 |
| Titanium | 22 | 22.21 | 0.95 | 22.02 | 0.07 |

In table 2, "Polynomial" stands for the polynomial approximation method of currently available technology and "Rational polynomial" stands for the rational polynomial approximation method according to the embodiment of the disclosure.

In addition, the method according to the embodiment of the disclosure further includes following steps: coding the two-dimensional map of the effective atomic number by an image processing technique, such as pseudo-color encoding in order to assigning the effective atomic number to a specific color code and then superimpose the two-dimensional map on an X-ray image. Thus, the method according to the embodiment of the disclosure can effectively assist security inspectors to quickly distinguish different materials and improve the performance of X-ray security inspection machines so as to enhance country's aviation, border and homeland security.

In summary, the effective atomic number calculation method for dual-energy X-ray imaging systems according to the embodiments of the disclosure can effectively calculate the effective atomic number of an unknown material (i.e. a material whose effective atomic number is unknown) based on the rational polynomial approximation method. That is, the calculating method according to the embodiments of the disclosure can improve the calculation accuracy of the effective atomic number without increasing the calculation time but maintaining the same calculation performance. Accordingly, the method can help the security personnel to more efficiently find out contraband so as to enhance border, homeland and flight security.

In addition, the method according to the embodiments of disclosure can be applied to not only 2D X-ray and 3D computer tomography security inspection systems (such as carry-on luggage and check-in luggage, container inspection, etc.), but also can be applied to other industrial non-destructive testing (NDT) fields, such as valuable metal recovery business and ore screening applications.

In addition, the method according to the embodiments of the disclosure also further improves the calculation accuracy of non-organic materials (effective atomic number range: $Z_{eff}$ is greater than 10, but less than 20), thereby enhancing the scope of application of the method.

What is claimed is:

1. A calculation method for a dual-energy X-ray imaging system, comprising:
    establishing an attenuation coefficient ratio of a dual-energy projection image of each of a plurality of reference materials according to known material characteristics of the reference materials respectively;
    establishing a calibration data set according to an effective atomic number of each of the reference materials and the attenuation coefficient ratio corresponding thereto;
    obtaining a characteristic model of a correlation between the material attenuation coefficient ratios and the effective atomic numbers of the reference materials by a rational polynomial approximation method;
    establishing a material attenuation coefficient ratio of a dual-energy projection image of an unknown material; and
    substituting the material attenuation coefficient ratio of the unknown material into the characteristic model to obtain an effective atomic number corresponding to the unknown material.

2. The calculation method of claim 1, wherein a step of obtaining the characteristic model of the correlation between the material attenuation coefficient ratios and the effective atomic numbers of the reference materials by the rational polynomial approximation method further comprises:
    performing an iterative method to execute an iterative optimization according to a measured value of the effective atomic number calculated by the characteristic model and the effective atomic number of the reference material corresponding thereto.

3. The calculation method of claim 2, wherein the iterative method is a nonlinear least-squares method.

4. The calculation method of claim 1, wherein a step of establishing the attenuation coefficient ratio of the dual-energy projection image of each of the reference materials according to the known material characteristics of the reference materials respectively comprises:
    providing a material with the known material characteristic as one of the reference materials, wherein the effective atomic number of the reference material is known;
    obtaining a high-energy projection image and a low-energy projection image of the reference material with the known material characteristic by the dual-energy X-ray imaging system; and
    calculating the material attenuation coefficient ratio of the reference material based on the high-energy projection image and the low-energy projection image.

5. The calculation method of claim 1, wherein a step of obtaining the characteristic model of the correlation between the material attenuation coefficient ratios and the effective atomic numbers of the reference materials by the rational polynomial approximation method comprises:

fitting a relation between the effective atomic numbers and the material attenuation coefficient ratios of the reference materials via a polynomial regression model.

6. The calculation method of claim 5, wherein the step of obtaining the characteristic model of the correlation between the material attenuation coefficient ratios and the effective atomic numbers of the reference materials by the rational polynomial approximation method comprises:

performing a curve fitting for the calibration data set to obtain a polynomial fitting coefficient of the polynomial regression model.

7. The calculation method of claim 1, wherein a step of establishing the material attenuation coefficient ratio of the dual-energy projection image of the unknown material comprises:

providing the unknown material;

obtaining a high-energy projection and a low-energy projection image of the unknown material via the dual-energy X-ray imaging system; and calculating the material attenuation coefficient ratio of the unknown material based on the high-energy projection image and the low-energy projection image of the unknown material.

8. The calculation method of claim 1, wherein a step of substituting the material attenuation coefficient ratio of the unknown material into the characteristic model to obtain the effective atomic number corresponding to the unknown material comprises:

converting the effective atomic number of the unknown material into a two-dimensional map.

9. The calculation method of claim 8, wherein a step of converting the effective atomic number of the unknown material into the two-dimensional map comprises:

coding the two-dimensional map of the effective atomic number by a pseudo-color encoding and superimposing the two-dimensional map on an X-ray image.

* * * * *